Oct. 10, 1933.   B. WHEELER   1,929,663
BALANCED YOKE DRIVE FOR LOCOMOTIVES
Filed March 7, 1931   2 Sheets-Sheet 2
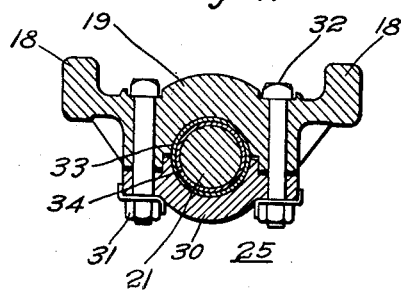
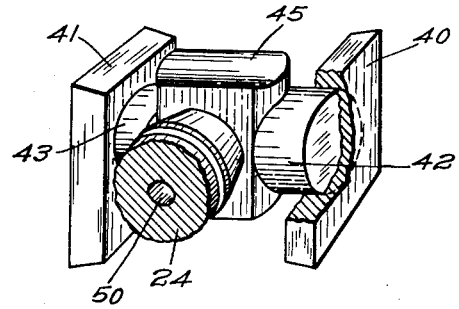
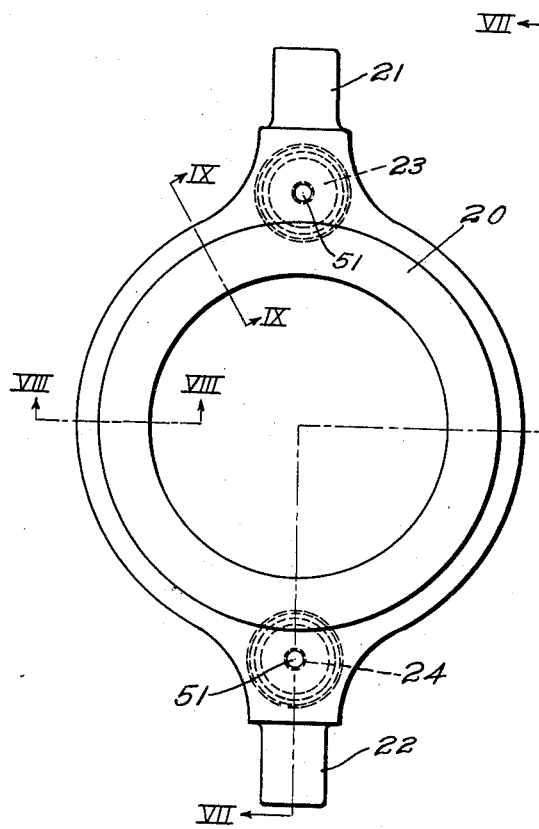
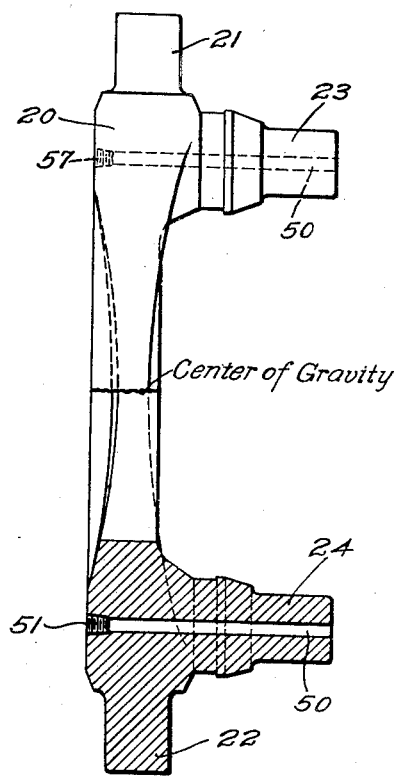
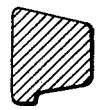
INVENTOR
*Brian Wheeler*

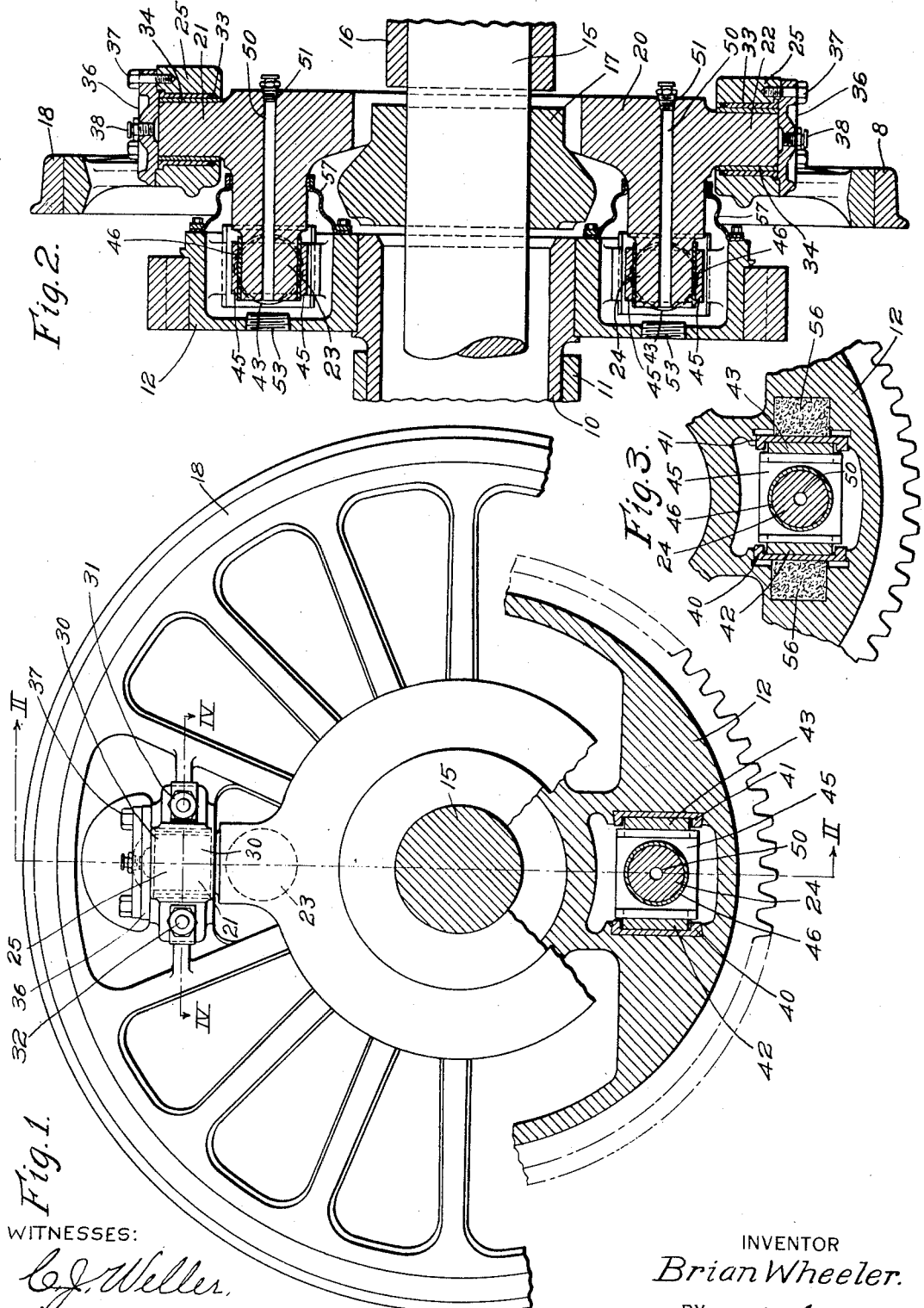

Patented Oct. 10, 1933

1,929,663

UNITED STATES PATENT OFFICE 1,929,663

BALANCED YOKE DRIVE FOR LOCOMOTIVES

Brian Wheeler, Wilkinsburg, Pa., assignor to Westinghouse Electric & Manufacturing Company, a corporation of Pennsylvania Application March 7, 1931. Serial No. 521,031

6 Claims. (Cl. 64—97)

My invention relates to locomotives and more particularly to connections for transmitting torque from a motor-driven quill shaft to a driving-wheel axle shaft.

A more specific object of my invention is to provide for transmitting torque from one rotatively mounted member to another in such manner that the rotatively mounted members have limited universal movement with respect to each other.

A further object of my invention is to provide for so transmitting torque from one rotatively mounted member to another that substantially no unbalanced centrifugal forces are transmitted to the rotatively mounted members when they are being rotated either about the same or about different axes.

Another object of my invention is to provide a connection for a pair of rotatively mounted members that permits universal-relative movement of the rotatively mounted members and for so transmitting torque from one of the rotatively mounted members to the other that any sudden change in torque, caused by one of the rotatively mounted members, is gradually absorbed by the connection and then gradually transmitted by the connection to the other rotatively mounted member for giving a smooth and continuous transmission of torque from one of the rotatively mounted members to the other.

Other objects of the invention will hereinafter become apparent.

The invention, accordingly, is disclosed in the embodiment thereof shown in the accompanying drawings, and comprises the features of construction, the combination of elements and the arrangement of parts which will be exemplified in the construction hereinafter set forth and the scope of the application of which will be indicated in the claims.

For a fuller understanding of the objects of the invention, reference should be had to the following detailed description, taken in connection with the accompanying drawings, in which:

Figure 1 is a view, in side elevation, of a motor-driven gear wheel and a driving wheel of a locomotive embodying the features of my invention, parts being broken away to show the arrangement of the structural elements of a universal connection utilized for connecting a yoke to the motor-driven gear wheel.

Fig. 2 is a view of a motor-driven gear wheel and a driving wheel of a locomotive embodying the features of my invention, taken along the section line II—II of Fig. 1.

Fig. 3 is a fragmentary view, in cross section, of a motor-driven gear wheel of a locomotive illustrating a resilient means for mounting the universal connection shown in Fig. 1 to the motor-driven gear wheel.

Fig. 4 is a view of a connection that is utilized for rotatively connecting a yoke to a driving wheel of a locomotive, taken along the section line III—III of Fig. 1.

Fig. 5 is a perspective view of the universal connection shown in Fig. 1 utilized for mounting a yoke upon a motor-driven gear wheel of a locomotive.

Fig. 6 is a view, in front elevation, of a yoke made in accordance with my invention and utilized for transmitting torque from a motor-driven gear wheel upon a driving wheel of a locomotive.

Fig. 7 is a view, partly in side elevation and partly in section, of the yoke, the section being taken along the line VII—VII of Fig. 6.

Fig. 8 is a view, in cross section, showing the web structure of the yoke, taken along the line VIII—VIII of Fig. 6.

Fig. 9 is a view, in cross section, showing the web structure of the yoke, taken along the line IX—IX of Fig. 6.

My invention, although capable of general application, is particularly applicable for transmitting torque from a motor-driven quill shaft of a locomotive to a driving-wheel axle.

Since the construction and operation of the motor-driven quill shaft and the driving wheel axle are well known to those skilled in the art, only a showing of the essential members is included in the accompanying drawings.

Referring now to Fig. 2 of the drawing, 10 designates an end portion of a quill shaft journalled to the super-structure of a locomotive by means of a bearing 11. On the end of the quill shaft that extends beyond the bearing 11 is securely mounted a motor-driven gear wheel 12.

The wheel axle 15, of which only an end portion is shown in Fig. 2, extends through, and is mounted to have relative movement within, the quill shaft 10. The ends of the wheel axle 15 are rotatively mounted in axle journal bearing 16, of which only one is shown.

It will be observed in Fig. 2 that the relative longitudinal movement of the wheel axle 15 within the quill shaft 10 is limited in one direction by the wheel hub 17 making contact with the bearing 11, and limited in the other direction by the wheel hub 17 making contact with the axle journal bearing 16.

However, it is essential that the wheel axle 15 be permitted to have some longitudinal relative movement within the quill shaft, in order to prevent the imposing of an excessive side thrust upon the flanges of the driving wheels when the locomotive is moving on a track.

It is evident, since the super-structure of the locomotive is resiliently supported, by springs or other suitable means, upon the axle journal bearings 16, that the wheel axle and the quill shaft, will rotate about different axes when the springs that support the superstructure are compressed or are released.

In view of the fact that the quill shaft and the wheel axle rotate sometimes about different axes, it is desirable that the connection utilized for transmitting torque from the quill shaft to the wheel axle be both dynamically and statically balanced.

In order to have a torque-transmitting connection that shall be substantially, dynamically and statically balanced, a symmetrically formed yoke 20 having two trunnions 21, 22, and two arms 23 and 24 formed thereon is provided. As preferably shown in Fig. 7, the center of gravity of the yoke lies upon the axis of the trunnions. However, no serious results will occur if the center of gravity of the yoke is not upon the axis of the trunnions.

The trunnions 21 and 22 project radially outward from the yoke 20 and are disposed diametrically opposite to each other so that they may be rotatively connected to the driving wheel 18. The arms 23 and 24 project perpendicularly from the plane of the yoke 20 so that they may be connected to the motor-driven gear wheel 12. Moreover, it will be observed in Fig. 7 that the axes of the two trunnions and the two arms form a plane that passes diametrically through the yoke 20 and perpendicular to the plane thereof.

Owing to the fact that the clearance between the wheel 18 and the axle journal bearing pedestal (not shown), through which the yoke revolves, is small, it is necessary to so shape the web of the yoke shown in Figs. 8 and 9, as to provide the necessary clearance. As is observed in Figs. 8 and 9, the cross section of the web of the yoke 20, taken along the line VIII—VIII, is smaller than the cross section taken along the line IX—IX because that part of the yoke taken along the line VIII—VIII is farther away from the axes of the trunnions 21 and 22 than that part of the yoke taken along the line IX—IX. In other words, in order to provide the proper clearance between the wheel 18 and the axle-journal-bearing pedestal, that part of the yoke that describes the longest arc, as the yoke rotates about the axes of the trunnions 21 and 22, relative to the plane of the wheel 18, is made the smallest in cross section.

The trunnions 21 and 22 of the yoke are rotatively mounted upon the driving wheel 18 by utilizing split bearings 25. The split bearings 25 are diametrically disposed about the driving wheel 18, so that, when the trunnions 21 and 22 are mounted upon the wheel 18, the axes thereof coincide with the diameter of the wheel. In other words, the axis, about which the yoke 20 rotates within the split bearings 25, perpendicularly intersects the axis about which the wheel 18 rotates.

As shown in Fig. 4, the base portions 19 of the split bearings 25 are formed integral with the spokes of the driving wheel 18. The caps 30 of the split bearings 25 are secured to the base portions 19 by utilizing bolts 32 and nuts 31. It will be observed that the base portions 19 and the cap portion 30 of the split bearings 25 are provided with removable bearing bushings 33, and the trunnions 21 and 22 are provided with removable bearing sleeves 34. These removable bearings are provided in order that they may be replaced, when worn, by new bearings, instead of replacing the entire yoke, when worn, by a new yoke.

In order that the yoke 20 may be so connected to the driving wheel 18 as to be substantially, dynamically and statically balanced, trunnion bearing end caps 36 are provided to prevent the trunnions 21 and 22 from moving axially within the split bearings 25. As shown best in Fig. 2, the trunnion-bearing end caps 36 are securely attached to the split bearings 25 by bolts 37 in order to form a bearing surface for the ends of the trunnions 21 and 22. Since the trunnions 21 and 22 are prevented from moving axially within the split bearings 25, the center of gravity of the yoke 20 lies at all times substantially upon the axis about which the wheel 18 rotates. In other words, the yoke 20 is so mounted upon the driving wheel 18 that substantially no unbalanced centrifugal forces are transmitted to the wheel 18, as there would be were the trunnions 21 and 22 of the yoke 20 permitted to move axially within the split bearings 25.

However, if the trunnions 21 and 22 of the yoke 20 were permitted to move axially within the split bearing 25, the yoke 20 would become dynamically and statically unbalanced because the center of gravity of the yoke 20 would be shifted away from the axes about which the wheel 18 rotates. This unbalanced condition would cause not only high internal stresses in driving parts of the locomotive but also cause the efficiency of the torque-transmitting connection to be reduced, because part of the energy, instead of being utilized in transmitting torque to the driving wheel 18, would be dissipated in overcoming the energy caused by frictional forces incident to reciprocating the trunnions 21 and 22 of the heavy yoke 20 within the split bearings 25.

In order that the split bearings 25 may be sufficiently lubricated, suitable fittings 38 are provided. It will be observed in Fig. 2 that the trunnion end bearing caps 36 prevent any lubricant from being wasted by centrifugal force, as it would be if no caps were provided.

The arms 23 and 24 of the yoke 20 are connected to the motor-driven gear wheel 12, in such manner that the connection shown in Fig. 1 provides universal movement between the motor-driven quill shaft 10 and the wheel axle 15, except angularly in the direction that the torque is being transmitted.

Referring to Fig. 5, which shows a perspective view of the universal connection, 24 represents one of the arms of the yoke 20. The arm 24 is slidably mounted in the cylindrical block 45, in order to permit relative longitudinal movement between the motor-driven quill shaft 10 and the wheel axle 15. The arm 24, although not securely attached to the block 45, is prevented from becoming disengaged from it because the longitudinal movements of the wheel axle 15 are limited by the hub 17 of the wheel 18 making contact with the axle journal bearings 16.

The block 45 is rotatively and slidably mounted within the shoes 42 and 43, in order to permit the motor-driven quill shaft 10 and the wheel axle 15 to rotate about the same axis or different parallel axes. Also, by virtue of the fact that the shoes 42 and 43 are rotatively mounted in wearing plates 40 and 41, the motor-driven shaft 10 and the wheel axle 15 are permitted to rotate about the same axis or about different axes, whether they are parallel or not. Therefore, it has been noted that the universal connection permits the motor-driven quill shaft 10 and the wheel axle 15 to move relative to each other in all directions, except angularly in the direction that the torque is being transmitted.

Likewise, the arms 23 and 24 of the yoke are provided with sleeve bearings 46, in order that the worn bearings may be replaced by new ones instead of replacing a worn yoke by a new one.

In some classes of locomotive service, it is desirable to have the torque-transmitting connection resiliently connected to the motor-driven quill shaft, in order to minimize high stresses of the driving parts. In view of this fact, as shown in Fig. 3, the wearing plates 40 and 41 of the universal connection are resiliently mounted upon the motor-driven gear wheel by utilizing suitable resilient means 56, such as springs, micarta blocks or other materials.

In order that a lubricant may be conveniently supplied to the universal connection, ducts 50, having suitable connections 51 are provided. Since some of the lubricant is liable to be wasted by centrifugal force, boots 57, as shown in Fig. 2, are provided. The boots 57 are connected to the motor-driven gear wheel 12 to extend outwardly to surround the shoulders of the arms 23 and 24 of the yoke 20.

As shown in Fig. 2, an opening in the web of the motor-driven gear wheel 12, having a screw cap 53, is provided in order to facilitate the assembling of the arms 23 and 24 with the universal connection of the motor-driven gear wheel 12.

In operation, when the motor-driven quill shaft and the wheel axle are being rotated about the same axis, the yoke will assume such position that its plane will be parallel to the plane of rotation of the wheel axle. It is to be noted that when the loke is revolving in this position, it is dynamically balanced for its center of gravity lies at all times upon the axis about which the motor-driven quill shaft and the wheel axle are rotating.

However, when the motor-driven quill shaft and wheel axle are being rotated about different axes, the yoke will so move within the split bearings 25 that its plane will oscillate with respect to the plane of rotation of the wheel 18. In this position, if the center of gravity of the yoke 20 is not upon the axis of the trunnions 21 and 22 the yoke will, at times, be slightly unbalanced dynamically because its center of gravity will, at certain intervals during the rotation, be displaced from the axis about which the wheel axle is rotating.

Therefore, it is observed that I have disclosed a connection for so transmitting torque from one rotatively mounted member to another that substantially no unbalanced centrifugal forces are transmitted to the rotatively mounted members when they are being rotated about the same axis or different axes.

While the illustrated example constitutes a practical embodiment of my invention, I do not limit myself strictly to the exact details herein illustrated, since they may be considerably varied without departing from the spirit of the invention, as defined in the appended claims.

I claim as my invention:

1. A torque transmitting connection comprising a rotatable member having a yoke rotatably supported thereon with the axis of rotation of the yoke extending transversely of the rotatable member, a second rotatable member having two universal connections mounted thereon, and arms interconnecting the said yoke and the said universal connections, each of said universal connections including two rotatable elements having arcuate ends and a slidable and rotatable block mounted between the two arcuate ends, the said blocks being connected to the said arms.

2. A torque transmitting connection comprising a rotatable member having a yoke rotatably supported thereon with the axis of rotation of the yoke extending transversely of the rotatable member, said yoking being constrained from moving longitudinally of its axis, a second rotatable member having two universal connections mounted thereon, and arms interconnecting the said yoke and the said universal connections, each of said universal connections including two rotatable elements having arcuate ends and a slidable and rotatable block mounted between the two arcuate ends, the said blocks being connected to the said arms.

3. A torque transmitting connection comprising a rotatable member having a yoke rotatably supported thereon with the axis of rotation of the yoke extending transversely of the rotatable member, a second rotatable member having two universal connections resiliently mounted thereon, and arms interconnecting the said yoke and the said universal connections, each of said universal connections including two rotatable elements having arcuate ends and a slidable and rotatable block mounted between the two arcuate ends, the said blocks being connected to the said arms.

4. A torque transmitting connection comprising two rotatable members, a yoke having two radially extending trunnions and two outwardly extending arms, means for rotatably supporting the trunnions upon one of the rotatable members with the axis of rotation of the trunnions extending transversely of the said rotatable member, two universal connections mounted upon the other of said rotatable member and connected to the outwardly extending arms, each of said universal connections including two rotatable elements having arcuate ends and a slidable and rotatable block mounted between the two arcuate ends, the said blocks being connected to the outwardly extending arms.

5. A torque transmitting connection comprising a rotatable member having a yoke rotatably supported thereon with the axis of rotation of the yoke extending transversely of the rotatable member, two outwardly extending arms connected to the yoke, a block connected to each arm, and a second rotatable member having means for slidably and rotatably mounting the blocks thereon, said means including rotatable elements having arcuate ends for engaging the said blocks.

6. A torque transmitting connection comprising a rotatable member having a yoke rotatably supported thereon with the axis of rotation of the yoke extending transversely of the rotatable member, two outwardly extending arms connected to the yoke, a block connected to each arm, a second rotatable member having means for slidably and rotatably mounting the blocks thereon, said means including rotatable elements having arcuate ends for engaging the said blocks, and means for resiliently mounting the rotatable elements upon the second rotatable member.

BRIAN WHEELER.